United States Patent
Liao (10) Patent No.: US 11,715,308 B2
(45) Date of Patent: Aug. 1, 2023

(54) ANIMAL IDENTIFICATION USING VISION TECHNIQUES

(71) Applicant: DELAVAL HOLDING AB, Tumba (SE)

(72) Inventor: Bohao Liao, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 17/284,293

(22) PCT Filed: Oct. 7, 2019

(86) PCT No.: PCT/SE2019/050976
§ 371 (c)(1),
(2) Date: Apr. 9, 2021

(87) PCT Pub. No.: WO2020/076225
PCT Pub. Date: Apr. 16, 2020

(65) Prior Publication Data
US 2021/0386035 A1    Dec. 16, 2021

(30) Foreign Application Priority Data
Oct. 10, 2018 (SE) .................................. 1800190-9

(51) Int. Cl.
*G08B 23/00* (2006.01)
*G06V 20/64* (2022.01)
(Continued)

(52) U.S. Cl.
CPC ............ *G06V 20/64* (2022.01); *A01K 29/005* (2013.01); *G06F 18/24* (2023.01); *G06V 10/143* (2022.01); *G06V 40/10* (2022.01)

(58) Field of Classification Search
CPC ...... A01K 29/005; G06V 20/64; G06V 40/10; G06V 10/143; G06K 9/6267
See application file for complete search history.

(56) References Cited

U.S. PATENT DOCUMENTS 5,412,420 A  * 5/1995 Ellis ....................... G01B 11/24
                                                          348/135
9,485,966 B1 * 11/2016 Betts-Lacroix ...... H05B 3/0033
(Continued)

FOREIGN PATENT DOCUMENTS

NZ          586888       10/2011
WO       2017/001538     1/2017

OTHER PUBLICATIONS

Fernandes et al., Image Analysis and Computer Vision Applications in Animal Sciences An Overview (Year: 2020).*
(Continued)

*Primary Examiner* — Quang Pham
(74) *Attorney, Agent, or Firm* — Nixon & Vanderhye (57) ABSTRACT

A vision system for determining an identity of an individual animal in a population of animals with known identity is provided. A first image sensor arrangement is configured to capture three-dimensional or thermographic images of the individual animal. A second image sensor arrangement is configured to capture two-dimensional images of the individual animal. Control circuitry is configured to obtain a first image of the individual animal captured by the first image sensor arrangement and to detect a body part in the first image, and in response to detecting the body part, obtain a second image of the individual animal captured using the second image sensor arrangement, and to identify the individual animal by comparing metrics of the second image with the reference data in a data storage.

25 Claims, 3 Drawing Sheets

(51) Int. Cl.
*A01K 29/00* (2006.01)
*G06V 10/143* (2022.01)
*G06V 40/10* (2022.01)
*G06F 18/24* (2023.01)

(56) References Cited

U.S. PATENT DOCUMENTS

| | | | | |
|---|---|---|---|---|
| 9,521,829 B2* | 12/2016 | McGlone | A01K 11/006 | |
| 9,578,853 B1* | 2/2017 | Heath | A01K 11/005 | |
| 10,502,630 B2* | 12/2019 | Isozaki | G01J 5/53 | |
| 2002/0159770 A1* | 10/2002 | Moultrie, Jr. | G03B 17/00 | 396/427 |
| 2002/0189550 A1* | 12/2002 | Julien | A01K 11/005 | 119/712 |
| 2003/0024481 A1* | 2/2003 | Kalscheur | A22B 5/007 | 119/174 |
| 2003/0055362 A1* | 3/2003 | Hampton | A61B 5/1038 | 600/595 |
| 2004/0019269 A1* | 1/2004 | Schaefer | A01J 5/0138 | 600/407 |
| 2004/0023612 A1* | 2/2004 | Kriesel | G06V 20/64 | 452/157 |
| 2004/0032974 A1* | 2/2004 | Kriesel | A01K 29/00 | 382/110 |
| 2005/0210267 A1* | 9/2005 | Sugano | H04W 12/069 | 713/186 |
| 2005/0257748 A1* | 11/2005 | Kriesel | A22B 5/007 | 119/51.02 |
| 2006/0126903 A1* | 6/2006 | Sharony | A01K 29/00 | 382/110 |
| 2007/0229522 A1* | 10/2007 | Wang | A61B 5/1113 | 345/547 |
| 2009/0315722 A1* | 12/2009 | Hou | G01J 5/025 | 340/578 |
| 2010/0217157 A1* | 8/2010 | Tasch | A61B 5/0036 | 600/592 |
| 2010/0288198 A1* | 11/2010 | Liao | A01J 5/017 | 119/14.08 |
| 2010/0289649 A1* | 11/2010 | Holmgren | G06V 40/23 | 119/14.08 |
| 2011/0196661 A1* | 8/2011 | Spicola | A01K 29/00 | 703/11 |
| 2011/0279650 A1* | 11/2011 | Liao | G06V 20/64 | 348/46 |
| 2012/0272902 A1 | 11/2012 | Hofman et al. | | |
| 2012/0307127 A1* | 12/2012 | Qian | G02B 7/005 | 348/335 |
| 2013/0100266 A1* | 4/2013 | Salsman | G06V 40/166 | 348/E7.085 |
| 2013/0284098 A1* | 10/2013 | Eineren | A01J 5/007 | 119/14.08 |
| 2014/0015945 A1* | 1/2014 | Bench | A61B 5/6887 | 119/421 |
| 2014/0140582 A1* | 5/2014 | Spicola, Jr. | A01K 1/0613 | 382/110 |
| 2014/0286536 A1* | 9/2014 | Pettersson | E02F 9/261 | 382/106 |
| 2014/0350410 A1* | 11/2014 | Axelsson | A61B 5/0077 | 600/476 |
| 2014/0355830 A1* | 12/2014 | Park | G06F 3/012 | 382/103 |
| 2015/0078626 A1* | 3/2015 | Kinard | G06V 40/18 | 382/110 |
| 2015/0107518 A1* | 4/2015 | Anglart | A01J 5/0175 | 119/14.02 |
| 2015/0302241 A1* | 10/2015 | Eineren | G06V 40/10 | 382/110 |
| 2015/0320308 A1* | 11/2015 | Akiba | A61B 3/14 | 382/131 |
| 2015/0339522 A1* | 11/2015 | Van Der Kamp | G06V 40/10 | 348/46 |
| 2016/0057395 A1* | 2/2016 | Yuki | A01K 29/005 | 348/222.1 |
| 2016/0066546 A1* | 3/2016 | Borchersen | A01K 11/004 | 382/110 |
| 2016/0095292 A1* | 4/2016 | Hosseini | H04N 1/00209 | 348/161 |
| 2016/0270364 A1* | 9/2016 | Woolf | G06T 7/20 | |
| 2016/0295838 A1* | 10/2016 | Van Der Kamp | H04N 7/183 | |
| 2017/0124727 A1 | 5/2017 | Amat Roldan et al. | | |
| 2017/0143241 A1* | 5/2017 | McBain | G06V 20/64 | |
| 2018/0027766 A1* | 2/2018 | Doubet | A01K 11/005 | |
| 2018/0049389 A1* | 2/2018 | Foresman | G06F 18/00 | |
| 2018/0049394 A1* | 2/2018 | Foresman | G06V 40/10 | |
| 2018/0049396 A1* | 2/2018 | Foresman | A01K 1/12 | |
| 2018/0070819 A1* | 3/2018 | Kanamori | G06V 10/56 | |
| 2018/0071069 A1* | 3/2018 | Mikkelsen | G06V 20/52 | |
| 2018/0092521 A1* | 4/2018 | Nolan | A61B 1/000094 | |
| 2018/0228129 A1* | 8/2018 | Yajima | G06V 10/95 | |
| 2018/0242558 A1* | 8/2018 | O'Connell | G01G 17/08 | |
| 2018/0271052 A1* | 9/2018 | Boguszewski | A01K 1/031 | |
| 2018/0302564 A1* | 10/2018 | Liu | H04N 13/25 | |
| 2018/0342052 A1* | 11/2018 | Higuchi | G06V 40/13 | |
| 2018/0348123 A1* | 12/2018 | Liu | G01N 33/025 | |
| 2019/0080158 A1* | 3/2019 | Roberson | G06V 10/147 | |
| 2019/0166801 A1* | 6/2019 | Klein | A01K 29/00 | |
| 2019/0180092 A1* | 6/2019 | Foresman | G06F 18/2113 | |
| 2020/0014910 A1* | 1/2020 | Larkins | G06T 7/586 | |
| 2020/0060240 A1* | 2/2020 | Yajima | A01K 13/00 | |
| 2020/0065966 A1* | 2/2020 | Spencer | A01J 5/007 | |
| 2021/0105980 A1* | 4/2021 | Idziaszek | A01K 11/005 | |

OTHER PUBLICATIONS

Levesque et al., Detection and Identification of Animals Using Stereo Vision (Year: 2010).*
Mayya et al., Visual tracking of small animals based on real-time Level Set Method with fast infra-red thermographic imaging (Year: 2011).*
McManus et al., Thermography for disease detection in livestock A scoping review (Year: 2022).*
Oishi et al., Animal Detection Using Thermal Images and Its Required Observation Conditions (Year: 2018).*
International Search Report for PCT/SE2019/050976 dated Dec. 4, 2019, 4 pages.
Written Opinion of the ISA for PCT/SE2019/050976 dated PCT/SE2019/050976, 9 pages.
Kumar et al., "Visual animal biometrics: survey", IET Biometrics, IEEE, May 1, 2017, vol. 6, No. 3, pp. 139-156, XP006076396, 18 pages.
SE Search Report for 1800190-9 dated Apr. 15, 2019, 3 pages.

* cited by examiner

ANIMAL IDENTIFICATION USING VISION TECHNIQUES

CROSS-REFERENCE TO RELATED APPLICATIONS

This application is the U.S. national phase of International Application No. PCT/SE2019/050976 filed Oct. 7, 2019 which designated the U.S. and claims priority to SE 1800190-9 filed Oct. 10, 2018, the entire contents of each of which are hereby incorporated by reference.

TECHNICAL FIELD

The present disclosure generally relates to the field of farming and more specifically the disclosure relates to methods and arrangements for automatically verifying identities of animals.

BACKGROUND

Animal identification has been around for decades. Initially, the preferred method was marking of a body part (branding) primarily to prevent the theft of valuable animal assets or as a general proof of ownership. Nowadays, in addition to theft prevention and general proof of ownership, animal identification serves an important role in the production management and disease control of livestock, such as dairy animals. For example, it may be desirable to identify dairy animals when milking, feeding etc.

Conventional methods of animal (livestock) management include: ear notching, primarily for pigs; plastic and barcoded ear tagging, primarily for cows and sheep; number designation on neck chains for cows; freeze branding numbers or letters using metal cooled with liquid nitrogen, dry ice, or alcohol; paint branding; and tattooing.

Electronic and biometric identification are alternatives to the conventional methods described above. Electronic identification requires the use of an electronic ear tag, injectable transponder, or a ruminal bolus to contain and be scanned for the desired information. However, unintentional damage to or intentional tampering of the microchip or antenna, as well as the unavailability of an appropriate scanning device can make identification impossible.

Biometric identification relies on the intrinsic characteristics unique to individuals without the necessity of invasive procedures and, unlike the traditional methods or microchip identification, the biometric data of an animal cannot be manipulated. For example, face recognition software for cows has recently been presented.

However, these types of identification are associated with other problems. For example, one of the difficulties is that cow can approach the camera in very different perspectives, since animals cannot be requested to pose for the camera, as is the case with humans.

SUMMARY

It is an object of the disclosure to alleviate at least some of the drawbacks with the prior art. Thus, it is an object to provide a solution that enables efficient and robust identification using vision techniques.

According to a first aspect, the disclosure relates to a vision system for determining an identity of an individual animal in a population of animals with known identity. The vision system comprises a first image sensor arrangement, a second image sensor arrangement, a data storage, and control circuitry. The first image sensor arrangement is configured to capture three-dimensional or thermographic images of the individual animal. The second image sensor arrangement is configured to capture two-dimensional images of the individual animal. The data storage is configured to store reference data representing the population of animals with known identity. The control circuitry is configured to obtain a first image of the individual animal, wherein the first image is a three-dimensional image or a thermographic image that is captured by the first image sensor arrangement and to detect a body part in the first image. The control circuitry is further configured to, in response to detecting the body part, obtain a second image of the individual animal, wherein the second image is a two-dimensional image that corresponds to the first image and that is captured using the second image sensor arrangement, and to identify the individual animal by comparing metrics of the second image with the reference data in the data storage. By combining information from different types of images, fast and reliable animal identification is achieved. The first type of image is an image suitable for fast and robust detection of a body part, whereas the second image type typically has good features for cow identification. The system can be used in the same way as a traditional identification system using e.g. RFID in milking, feeding or other applications where it is desirable to identify and track cows. However, the proposed solution does not require that the cows are carrying RFID tags, or any other type of tag or marking.

In some embodiments, the control circuitry is configured to identify, based on the first image, metrics of the second image that corresponds to the detected body part and to determine the identity by comparing the identified metrics with the reference data. By using a first image, which has properties that enable efficient body part detection, metrics suitable for identification are determined in an efficient way. Thereby, the identification may also be more efficient and reliable.

In some embodiments, the control circuitry comprises a classifier configured to compare the metrics of the second image with the reference data. Hence, a simple implementation is possible, as a standard classifier can be used.

In some embodiments, the control circuitry is configured to repeat the capturing of a first image until the body part is detected, and to obtain the second image in response to detecting the body part in the first image. Hence, one may scan for the body part in a sequence of images of a first image type. Not until a body part is detected, the more complex identification, using an image of a second image type, is performed.

In some embodiments, the first image has lower angular resolution than the second image. Thereby, less processing capacity is required, as the detection of a body part may be performed on less complex images, which still provide good body part detection properties.

In some embodiments, the first and second images are aligned or correlated in space and time. Thereby, it is possible to feed only the relevant part of the second image into the identification algorithm, which makes the identification more efficient.

In some embodiments, the second image comprises colour information and wherein the first image does not comprise colour information. This makes the identification more efficient, as colour information is beneficial in the identification, but not when scanning for the body part.

In some embodiments, the body part is a head, back or nose of the individual animal. Hence, the proposed method may be applied to different types of identification algorithms.

In some embodiments, the first image sensor arrangement and the second image sensor arrangement are arranged in the same camera. Thereby, a small installation is possible.

According to a second aspect, the disclosure relates to method for determining an identity of an individual animal in a population of animals with known identity that are represented by reference data stored in a data storage. The method comprises capturing a first image of the individual animal, wherein the first image is a three-dimensional image or a thermographic image and detecting a body part of the individual animal in the first image. The method further comprises obtaining, based on the detecting, a second image of the individual animal, wherein the second image is a two-dimensional image that corresponds to the first image, and determining the identity of the individual animal by comparing metrics of the second image with the reference data.

In some embodiments, the method comprises identifying, based on the first image, metrics of the second image that corresponds to the detected body part and the determining comprises comparing the identified metrics with the reference data.

In some embodiments, the identifying comprises using a classifier to compare the second image with the reference data.

In some embodiments, the capturing of the first image is repeated until the body part is detected, and wherein the obtaining is performed in response to detecting the body part in the first image.

In some embodiments, the first image has lower angular resolution than the second image. In some embodiments, the first and second images are aligned or correlated in space and time. In some embodiments, the second image comprises colour information and wherein the first image does not comprise colour information.

According to a third aspect, the disclosure relates to control circuitry configured to perform the method according to the second aspect.

According to a fourth aspect, the disclosure relates to a computer program comprising instructions which, when the program is executed by a computer, cause the computer to carry out the method according to the second aspect.

According to a fifth aspect, the disclosure relates to a computer-readable medium comprising instructions which, when executed by a computer, cause the computer to carry out the method according to the second aspect.

DETAILED DESCRIPTION

Animals may be recognized by individual biometric characteristics in the same way as humans. For example, traditional face recognition algorithms have been adapted to different animals. The procedure of identifying an individual animal from a population of animals using biometric techniques typically comprises two steps. First, a body part e.g. a head or back, needs to be found in the image. This is referred to as body part detection or object detection. The body part detection can be rather challenging as an animal does not intuitively face the camera or sensor. Hence, when continuously capturing images, then it may be difficult to find an image suitable for animal identification. Furthermore, a body part of an animal may look very different from different angles. Hence, in many cases, a large number of images need to be captured. Thereafter, a few identification images which are assumed to be suitable for identification, are selected for further processing.

In the second step, the identification images are matched to a set of templates comprising reference data corresponding to the individuals of the population of animals. This is e.g. done using a so-called matcher. The matcher or classifier may use different commonly known techniques e.g. support vector machine, random forest, or more advanced machine learning. Basically, most facial recognition algorithms suitable for human faces may be adapted to be used for animals.

The matcher takes one or more identification images as input and then, provided that identification is successful, it provides an identity of an individual animal as output. The output may alternatively be "no match" if the identification is not successful. The matching is in many cases a quite complex operation, in particular if there are many animals in the population. Hence, it is typically desirable to only feed a few identification images of good quality into the matcher.

When using vision technique systems for animal identification, high reliability on body part (or object) detection and animal identification is required. Typically, it is desirable to quickly detect the body part e.g. a cow face. Furthermore, the vision technique systems need to be able to handle different colour of cows, different background in an installation and different lighting conditions.

The proposed technique is based on the insight that the body part detection and animal identification are quite different operations. The body part detection basically only needs to identify a body part, preferably when seen from an advantageous direction, e.g. straight from the front. The individual characteristics of the animal are not important when detecting the body part. Rather, what is important is the overall shape. Hence, an image with low resolution and without colour information may advantageously be used. However, for the identification, image details such as colour and angular resolution are important.

This disclosure proposes a method that uses a combination of different types of images for animal identification. More specifically, a first type of image is used to detect a particular body part of an animal and a second type of image is used for an actual identification of the individual. For example, a camera configured to capture both 2D (two-dimensional) and 3D (three-dimensional) images is used. A 3D image is for example suitable for cow head detection, as a cow head has unique 3D features, which is very different from the background. Thus, an algorithm for detection of a cow head using a 3D image is typically both robust and fast. On the other hand, 2D images are suitable for animal identification, provided that the animal is depicted from a pre-determined angle. A 2D image may comprise more features for identification of an individual such as colour and high resolution. It may even be possible to read a number tag, e.g. an ear tag, from a 2D image with good quality.

The different types of images need to be aligned (or at least correlated), such that when the body part is detected in a first image (of a first image type), then a segment of the second image (of a second image type) that comprises the detected body part can be identified. The actual identification can then be performed using a standard identification algorithm to match the identified segment of the second image (of the second image type) with reference data e.g. a set of templates. However, because it is already verified that the first image comprises the body part, the matching step will typically be more efficient.

Figure 1:
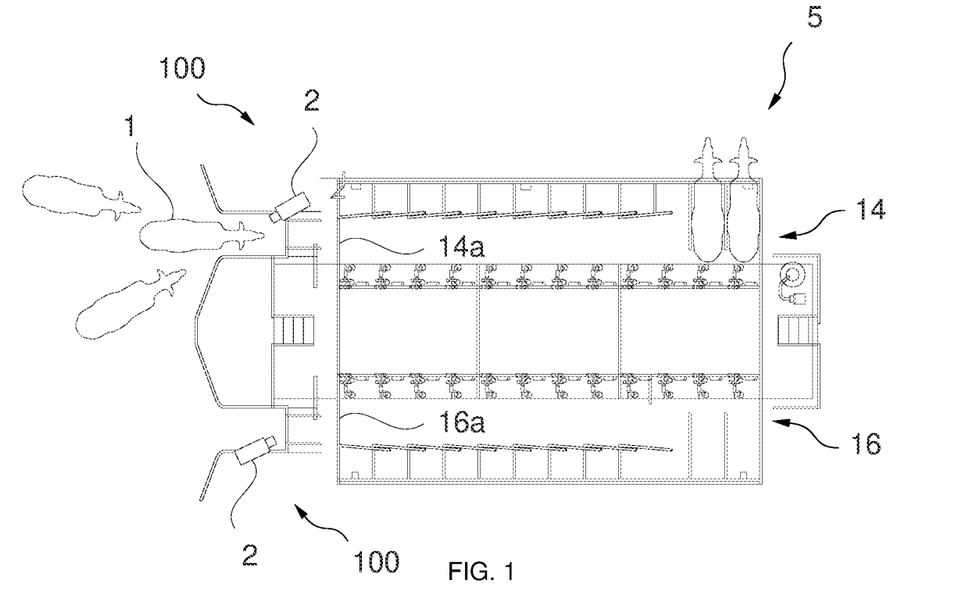
FIG. 1 is a schematic top plan view of a parallel stall milking parlour wherein an example embodiment of the proposed technique is implemented.

FIG. 1 shows a milking parlour 5 for milking a plurality of cows 1, where the proposed technique may be implemented. The milking parlour 5 is here a double parlour, including a first row of parallel milking stalls 14, and a second row of parallel milking stalls 16, each of which including twelve stalls. Each of the rows 14, 16 is provided with a vision system 100 (FIG. 2) including a camera 2 in a respective front end thereof 14a, 16a, through which the cows 1 can pass serially while being identified. In this way each cow that enters or exits the parlour may be identified.

The proposed technique will now be described in further detail with reference to the flow chart of FIG. 5 and the vision system 100 of FIG. 2.

Figure 2:
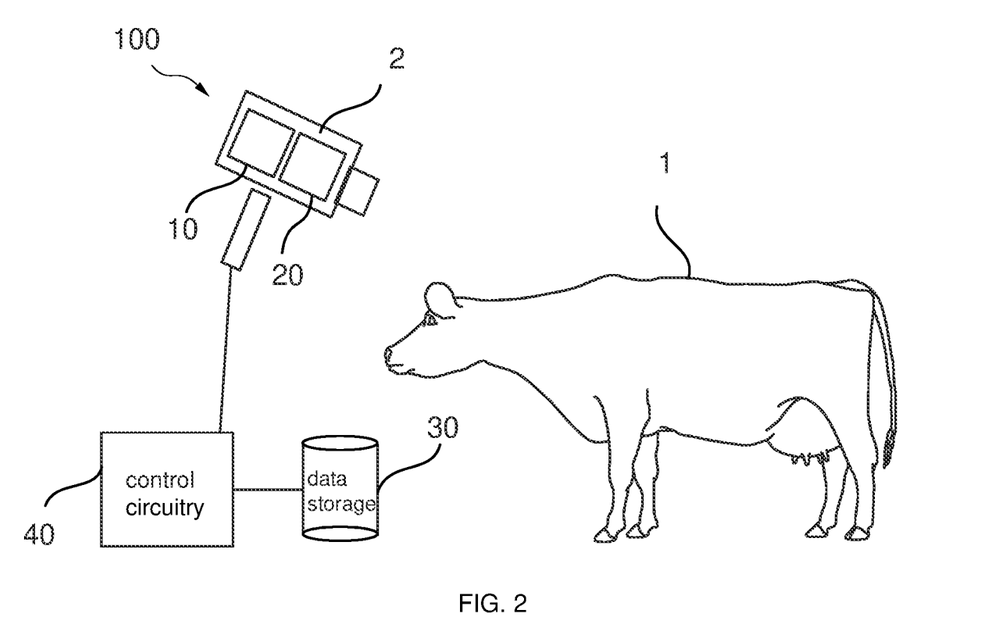
FIG. 2 illustrates a vision system for determining an identity of an individual animal according to some embodiments.

FIG. 2 illustrates a vision system 100 for determining an identity of an individual animal 1 in a population of animals with known identity. The population is in this example e.g. all cows present at a farm. The vision system can be used in the same way as e.g. a traditional identification system using RFID. For example, it may be used to keep track of cows during milking or feeding. In the example of FIG. 1, vision systems 100 are installed in the milking parlour 5 in order to track which cows are entering and/or exiting the milking parlour 5. However, the vision system may be implemented in other contexts. For example, the system may be implemented in a mobile phone and some of the computations may then be performed in a backend server.

The vision system 100 comprises first image sensor arrangement 10, a second image sensor arrangement 20, a data storage 30 and control circuitry 40. The first image sensor arrangement 10 is configured to capture images of the individual animal 1 that are suitable for detection of a body part of an animal. Hence, it is typically an image sensor that is not affected by colour or shadows. Thus, the first image sensor arrangement 10 is good at imaging shapes rather than details.

In one embodiment the first image sensor arrangement 10 is a three-dimensional image sensor. Three-dimensional image sensors are commonly known to be good for detection of objects, for example cow heads. Extending body parts, such as cow heads can easily be detected in a 3D image and it is then easy to verify that the extending part is e.g. a cow head by analysing its characteristic shape and size.

In another embodiment the first image sensor arrangement 10 is a thermographic sensor, such as an InfraRed, IR, sensor. An IR sensor is an electronic instrument used to sense certain characteristics of its surroundings by either emitting and/or detecting Infrared light. An infrared sensor is good for object detection as it does only picture the contour and no other visible details that are characteristic for the individual.

The second image sensor arrangement 20 is configured to capture two-dimensional images of the individual animal 1. The second image sensor arrangement 20 is suitable for identifying an individual. For example, the second image sensor arrangement 20 is configured to capture images with higher angular resolution than the first image sensor arrangement 10. Angular or spatial resolution is the ability of any image-forming device such as an optical or radio telescope, a microscope, a camera, or an eye, to distinguish small details of an object. In other words, this basically means that the second image sensor arrangement 20 is configured to capture images with more details than the first image sensor arrangement 10. The second image sensor arrangement 20 is e.g. a two-dimensional image sensor. The second image sensor arrangement 20 may also be configured to capture images with colour information, i.e. colour images. Colour is a feature that is typically important to identify an individual, but that may be a disadvantage for the detection as it might make the contours and shape less visible.

In some embodiments, the first and second images are aligned or correlated in space and time. In other words, at least one reference point is known in both images. For example, one particular point of the cow is located in the same pixel in both images. Complete alignment in space is of course beneficial, but in practice it is enough that, for pixels in the first image which are related to the detected body part, it is possible to identify a corresponding pixel, or group of pixels, in the other image.

In some embodiments, the first image sensor arrangement 10 and the second image sensor arrangement 20 are arranged in the same housing e.g. a camera 2.

However, it is not necessary that they are arranged in the same camera as long as they are aligned. The camera 2 is in some embodiments placed where only one single animal can pass at the time, e.g. a passageway. However, the camera 2 may as well be mobile and operated by a user e.g. a farmer.

The data storage 30 is a storage device configured to store reference data representing the population of animals with known identity. The population is e.g. the cows on a farm. The reference data is stored in association with an indicator of the identity of the respective individual animal 1. In some embodiments the reference data comprises image data or other metrics derived from the reference image data. The metrics is e.g. features such as colour, distance between eyes, between eyes and nose etc. In some embodiments the reference data comprises a trained model of the individual animal (or rather of the body part) e.g. a convolutional neural network. Such models are commonly known and will therefore not be described in further detail.

The control circuitry 40, or simply controller or control unit, is a computing device configured to determine an identity of an individual animal in a population of animals with known identity that are represented by reference data stored in a data storage 30. The control circuitry 40 may either be implemented in connection to the image sensor arrangements 10, 20, e.g. in the camera 2, or in connection to the camera 2. The control circuitry may also (at least partly) be implemented in a server that is located at a remote location.

Figure 4:
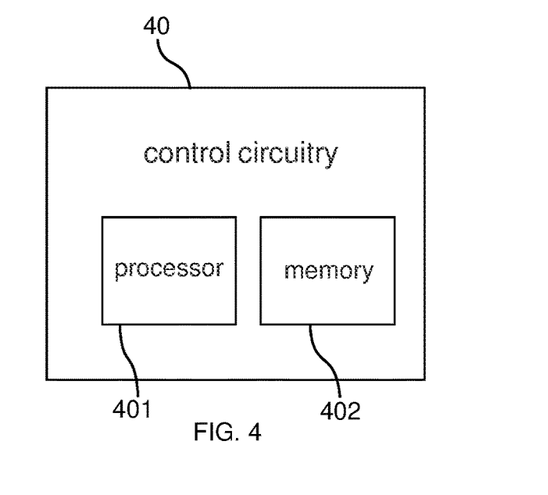
FIG. 4 illustrates control circuitry according to some embodiments.

FIG. 4 illustrates the control circuitry 40 in more detail. The control circuitry 40 comprises hardware and software. The hardware is for example various electronic components on a for example a Printed Circuit Board, PCB. The most important of those components is typically a processor 401 e.g. a microprocessor, along with a memory 402 e.g. EPROM or a Flash memory chip. The software (also called firmware) is typically lower-level software code that runs in the microcontroller. The control circuitry 40 comprises a communication interface, e.g. I/O interface or other communication bus, for communicating with the image sensor arrangements 10, 20 and the data storage 30. In some embodiments the communication interface is wireless.

Figure 5:
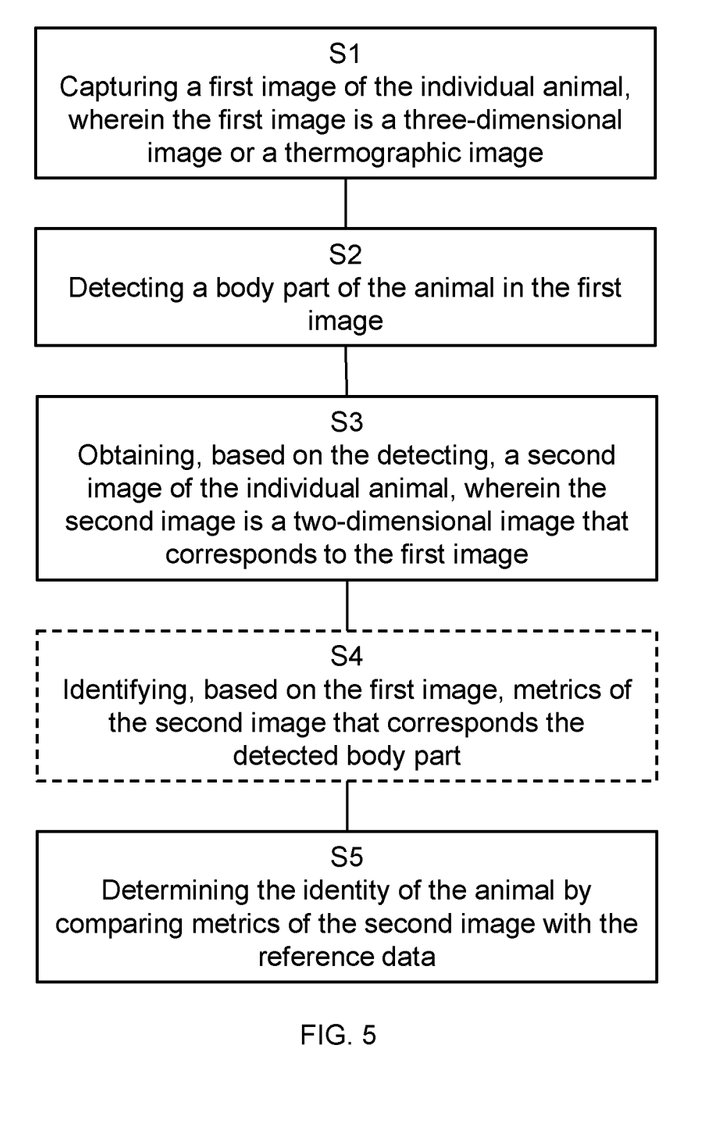
FIG. 5 is a flowchart of the method for determining an identity of an individual animal according to some embodiments.

The control circuitry 40, or more specifically a processor 41 of the control circuitry 40, is configured to cause the control circuitry 40 to perform all aspects of the method described in FIG. 5. This is typically done by running computer program code stored in the memory 42 in the processor 41 of the control circuitry 40.

More particularly, the control circuitry 40 is configured to obtain a first image of the individual animal, wherein the first image is a three-dimensional image or a thermographic image that is captured by the first image sensor arrangement 10. In other words, a 3D or IR image is captured. The first image does typically not comprise colour information, or at least very little colour information.

For example, the control circuitry 40 causes the first image sensor arrangement 10 to capture the image. Alternatively, the images are already captured by the first image sensor arrangement 10. Then the obtaining corresponds to retrieving an already captured image e.g. from the data storage 30.

The control circuitry 40 is further configured to detect a body part in the first image, and to obtain a second image of the individual animal based on the detecting. The body part is for example a head, back or nose of the animal.

In some embodiments, the first and second images are recorded continuously at the same (or at least approximately the same e.g. a few milliseconds in-between) points in time, but only the first image is used to detect the body part. When the body part is found, the corresponding second image recorded at the same time point is used for identification. In this way there is no significant delay between the images. A delay might potentially cause erroneous mapping between the first and the second image.

In some embodiments, the actual capturing of the second image is triggered by the detection of the body part. In other words, the second image is captures when a body part, such as a cow head at the right angle, is detected in the first image. Stated differently, in some embodiments, control circuitry 40 is configured to repeat the capturing of a first image until the body part is detected, and to obtain the second image in response to detecting the body part in the first image. This option implies that 3D/IR images are continually recorded until e.g. a cow face is found.

Figure 3A:
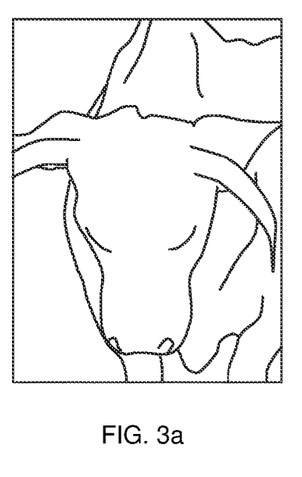
FIG. 3 illustrates different images of a cow captured by the camera in the vision system of FIG. 2.
Figure 3B:
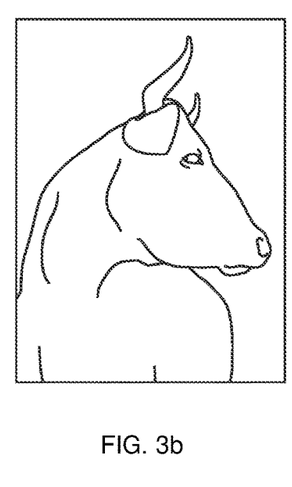
Figure 3C:
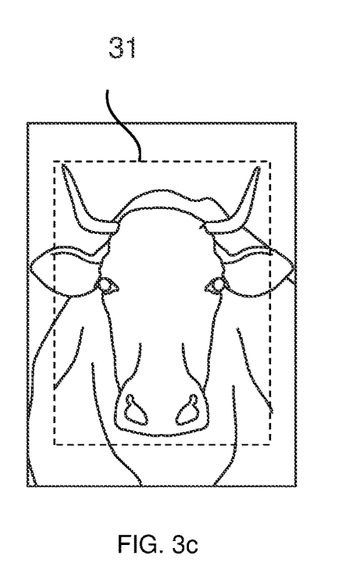

FIG. 3a-3c illustrates a series of three images of a cow head captured by the camera 2 of FIG. 2. FIG. 3a illustrates the cow pictured when the cow is bending its head down, the FIG. 3b illustrates the cow pictured when turning its head to the left (the cow's left) and FIG. 3c illustrates the cow pictured when the cow is looking straight into the cameras, which are then capturing the cow head from the front. In this example, the cow head would be detected in FIG. 3c, as it illustrates the cow head from the desired angle. Hence, a corresponding second image (or a segment 31 of the second image) would be used for the identification.

The second image is a two-dimensional image that corresponds to the first image and that is captured using the second image sensor arrangement 20. Thus, the second image is an image that is suitable for identifying an individual animal. Hence, it typically comprises enough details to differentiate individuals from each other, as it is captured by the second image sensor arrangement 20, described in more detail in the foregoing. For example, it uses a two-dimensional image with higher resolution that the first image. The second image may also comprise colour information.

The control circuitry 40 is further configured to identify the individual animal by comparing metrics of the second image with the reference data in the data storage 30. The comparing may be direct or indirect. In some embodiments, the comparing comprises comparing the metrics to an intermediate model created based on the reference data. In other words, this step means that the identity is determined based on a relation between the second image and the reference data.

In some embodiments, the control circuitry 40 is configured to identify, based on the first image, metrics of the second image that corresponds to the detected body part and to determine the identity by comparing the identified metrics with the reference data. Hence, features or image segments from the second image are compared to a set of templates, i.e. reference images. If the similarity between the second image and one or more of the images in the set of templates is above a certain threshold, then a match is found.

In some embodiments, the control circuitry 40 comprises a classifier configured to compare the metrics of the second image with the reference data. Such classifiers are commonly used for authentication and identification in biometric applications. For example, the classifier uses a Convolutional Neural Network, CNN, or an Artificial Neural Network. In other words, metrics of the second image e.g. an image segment(s), features or other information, is sent to the classifier. The classifier, then returns the identity of the individual animal. A classifier may require an image of an exact size as input. Thus, a segment 31 (FIG. 3c) of the required size may be selected from the second image. This may be done by cutting the edges or by selecting an area of the correct size around the detected body part.

The disclosure also relates to a corresponding method for use in a vision system for determining an identity of an individual animal in a population of animals with known identity that are represented by reference data stored in a data storage. The method will now be explained with reference to the flow chart illustrated in FIG. 5, and to the illustrations in the other figures. The method is performed by the control circuitry 40 (FIG. 4). The method may be implemented as a computer program comprising instructions which, when the program is executed by a computer (e.g. a processor in the control circuitry 40 (FIG. 4)), cause the computer to carry out the method. According to some embodiments the computer program is stored in a computer-readable medium (e.g. a memory or a compact disc) that comprises instructions which, when executed by a computer, cause the computer to carry out the method. The method is typically continuously performed in an application, such as in the vision system 100 of FIG. 2.

The method comprises capturing S1 a first image of the individual animal 1, wherein the first image is a three-dimensional image or a thermographic image. In other words, the first image sensor arrangement 10 is controlled to capture a first image 10, which has good properties for detecting a body part, as explained above. The method further comprises detecting S2 a body part of the individual animal in the first image. The body part is as mentioned above, e.g. a head, back, side or nose of the animal. The detecting is performed e.g. using conventional object detection techniques. Typically, the capturing is continually repeated until a suitable image of a body part is detected. Hence, according to some embodiments the capturing S1 of the first image is repeated until the body part is detected, and the obtaining S3 is performed in response to detecting the body part in the first image.

The method further comprises obtaining S3, based on the detecting S2, a second image of the individual animal, wherein the second image is a two-dimensional image that corresponds to the first image. In other words, information about a detected body part is used to select a second image to use for animal identification. The second image is for example selected based on the presence of the body part that is to be matched. In some embodiments the obtaining S3 comprises capturing or selecting the second image such that the animal's pose is advantageous for animal identification e.g. that the animal is facing the camera. In this way the chance that the second image is suitable for animal identification is increased.

That the first image corresponds to the second image implies that if the position (e.g. pixel) of one point of the animal (e.g. an eye) is known in the first image, then that position is also known in the second image. Hence, there is a known relationship between the images. Typically, the images are also captured at the same point in time, or at least very close in time (less than a second in-between). In other words, the first and second images are aligned or correlated in space and time.

The second image also comprises more details than the first image, that are usable to identify the individual animal. For example, the first image has lower angular resolution than the second image. According to some embodiments the second image comprises colour information and the first image does not comprise colour information. Hence, the first image is an image suitable for body part detection, while the second image is typically an image suitable for animal identification.

The method further comprises determining S5 the identity of the animal by comparing metrics of the second image with the reference data. For example, a suitable image segment 31 picturing the body part is compared to a set of reference images (sometimes referred to as templates). The segment 31 may be determined as, due to the correlation between the images, the position of the detected body part the second image is also known. In other words, according to some embodiments the method comprises identifying S4, based on the first image, metrics of the second image that corresponds to the detected body part and determining S5 an identity of the animal by comparing the identified metrics with the reference data. In other words, the first image, which is suitable for body part detection is used to obtain a suitable second image.

The second image corresponds to the first image. For example, it is captured at the same time as the first image. Thus, based on information from the first image it is possible to locate the detected body part also in the second image. Information about the body part retrieved from the first image may be used when analysing the second image to identify the animal. For example, the second image is obtained such that parts of the image not picturing the body part are cropped or removed. This will make the processing of the second image required for animal identification less complicated. Hence, by combining data from two images of different types, e.g. captured by different types of sensors, the identification procedure may be improved.

According to some embodiments the determining S5 comprises using a classifier to compare the second image with the reference data. There are several such techniques available, as described in the foregoing.

In some embodiments the animal has a number tag attached e.g. to its ear. If it is possible to read the number from the second image, then the number may be compared to reference data.

The method is herein described with reference to one animal. However, the method may also be used for several animals. For example, one image comprising several body parts (e.g. cow heads) could be captured using the first image sensor arrangement 10. All identified animals could then be detected using a corresponding second image, where one segment is selected for each animal. Alternatively, a user may be prompted via the user interface to select one or more of the detected animals in an image displayed at the screen of e.g. a mobile phone for identification.

The terminology used in the description of the embodiments as illustrated in the accompanying drawings is not intended to be limiting of the described method; control arrangement or computer program. Various changes, substitutions and/or alterations may be made, without departing from disclosure embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A vision system for determining an identity of an individual animal in a population of animals with known identity, the vision system comprising:
   a first image sensor configured to capture three-dimensional or thermographic images of the individual animal;
   a second image sensor configured to capture two-dimensional images of the individual animal;
   a data storage that stores reference data representing the population of animals with known identity; and
   control circuitry configured to:
      operate the first image sensor to obtain a first image of the individual animal, the first image being a three-dimensional image or a thermographic image,
      determine whether a body part of the individual animal is detected in the first image,
      in response to a determination that the body part is detected in the first image, operate the second image sensor to obtain a two-dimensional second image of the body part of the individual animal detected in the first image, and
      identify the individual animal by comparing metrics of the body part captured in the second image with two-dimensional data of the body part incorporated within the reference data in the data storage for each animal in the population of animals.

2. The vision system according to claim 1, wherein the control circuitry is further configured to identify, based on the first image, metrics of the second image that corresponds to the detected body part and to determine the identity by comparing the identified metrics with the reference data.

3. The vision system according to claim 1, wherein the control circuitry comprises a classifier configured to compare the metrics of the second image with the reference data.

4. The vision system according to claim 1, wherein the control circuitry is configured to repeat the capturing of the first image until the body part is detected, and to obtain the second image when the body part in the first image is detected.

5. The vision system according to claim 1, wherein the second image sensor is configured to capture images with a higher angular resolution than an angular resolution of images captured by the first image sensor.

6. The vision system according to claim 1, wherein the first and second images are aligned or correlated in space and time.

7. The vision system according to claim 1,
wherein second image comprises color information, and
wherein the first image does not comprise color information.

8. The vision system according to claim 1, wherein the body part is one of a head, a back, a side, or a nose of the individual animal.

9. The vision system according to claim 1, wherein the first image sensor and the second image sensor are disposed in a same camera.

10. The vision system according to claim 1, wherein the first image sensor and the second image sensor are configured to be located in a passageway through which only one single animal of the population of animals can pass at a time.

11. The vision system according to claim 1, wherein the control circuitry determines that the body part of the individual animal is detected in the first image when the body part is detected having a desired angle in the first image.

12. A method for determining an identity of an individual animal in a population of animals with known identity that are represented by reference data stored in a data storage, the method comprising:
capturing a first image of the individual animal, the first image being a three-dimensional image or a thermographic image;
detecting a body part of the individual animal in the first image;
responsive to the detecting of the body part of the individual animal in the first image, obtaining a two-dimensional second image of the body part of the individual animal; and
determining and outputting the identity of the individual animal by comparing metrics of the body part captured in the second image with two-dimensional data of the body part incorporated within the reference data for each animal in the population of animals.

13. The method according to claim 12, further comprising:
identifying, based on the first image, metrics of the second image that correspond to the detected body part, and
wherein the determining comprises comparing the identified metrics with the reference data.

14. The method according to claim 12, wherein the determining comprises using a classifier to compare the second image with the reference data.

15. The method according to claim 12,
wherein the capturing of the first image is repeated until the body part is detected, and
wherein the obtaining is performed in response to detecting the body part in the first image.

16. The method according to claim 12, wherein the first image has a lower angular resolution than an angular resolution of the second image.

17. The method according to claim 12, wherein the first and second images are aligned or correlated in space and time.

18. The method according to claim 12,
wherein the second image comprises color information, and
wherein the first image does not comprise color information.

19. The method according to claim 12, wherein the body part is one of a head, a back, a side, or a nose of the individual animal.

20. A non-transitory computer-readable medium comprising instructions which, when executed by a computer, cause the computer to carry out the method according to claim 12.

21. A method for determining an identity of an individual animal in a population of animals with known identity that are represented by reference data stored in a data storage, the method comprising:
obtaining a first image of the individual animal, the first image being a three-dimensional image or a thermographic image captured by a first image sensor;
detecting a body part of the individual animal from the obtained first image;
obtaining a second image of the body part of the individual animal detected from the first image, the second image being a two-dimensional image captured by a second image sensor, the second captured image being correlated with the first captured image such that, for first pixels in the first captured image that are related to the detected body part, one or more second pixels corresponding to the first pixels that are related to the detected body part are identified in the second captured image; and
determining and outputting the identity of the individual animal by comparing metrics of the second image, from the one or more second pixels that correspond to the first pixels related to the detected body part, with the reference data.

22. The method according to claim 21, wherein the capturing of the second image is triggered by the detecting the body part in the first captured image.

23. A milking parlour, comprising:
a vision system for determining an identity of an animal of a population of animals with known identity to be milked in the milking parlour, the vision system including at least a camera, a data storage, and control circuitry,
the camera equipped with a housing, and first and second image sensors arranged within said housing, the first image sensor configured to capture three-dimensional or thermographic images of an individual animal, and the second image sensor configured to capture two-dimensional images of the individual animal,
the data storage configured to store reference data representing the population of animals with known identity, and
the control circuitry arranged to control the camera and the data storage,
the control circuitry configured to:
obtain a first image of the individual animal, the first image being a three-dimensional image or a thermographic image that is captured by the first image sensor,
detect a body part of the individual animal in the first image,
obtain a second image of the body part of the individual animal detected in the first image, the second image being a two-dimensional image of the body part that corresponds to the first image and that is captured using the second image sensor, and identify the individual animal by comparing metrics of the second image with two-dimensional image data for each animal of the population of animals in the reference data in the data storage.

24. The milking parlour according to claim 23, wherein the camera is located at a front end of a row of milking stalls of the milking parlour through which the animals of the population pass serially while being identified by vision system.

25. The milking parlour according to claim 23, wherein the camera is located at a passageway of the milking parlour through which only one single animal of the population of animals can pass at a time.

* * * * *